(No Model.)
A. KLIEMETSCHEK.
PROCESS OF WASHING YEAST.
No. 470,361. Patented Mar. 8, 1892.
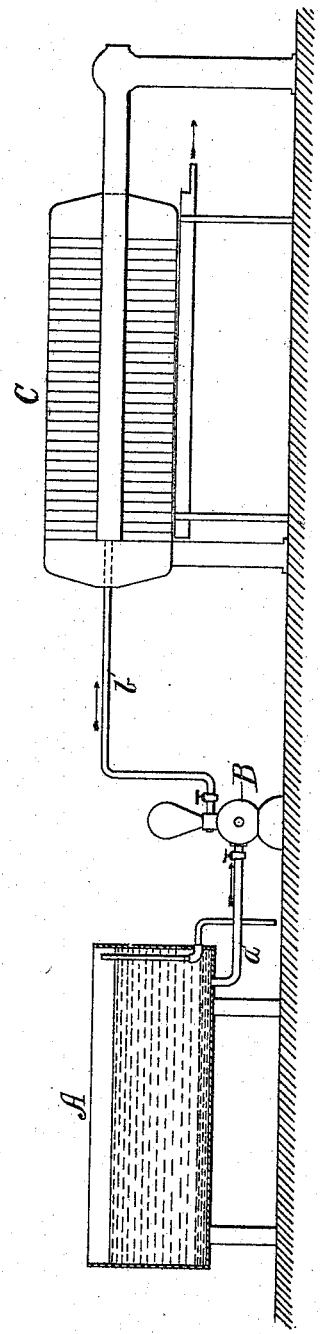
Witnesses
E. R. Conner
E. V. D. Miller
Inventor
Adolph Kliemetschek
By Butterworth & Dowell
Attorneys

UNITED STATES PATENT OFFICE.

ADOLPH KLIEMETSCHEK, OF NEW YORK, N. Y., ASSIGNOR TO FLEISCHMANN & CO., OF SAME PLACE.

PROCESS OF WASHING YEAST.

SPECIFICATION forming part of Letters Patent No. 470,361, dated March 8, 1892.

Application filed August 20, 1891. Serial No. 403,196. (No model.)

*To all whom it may concern:*

Be it known that I, ADOLPH KLIEMETSCHEK, a citizen of Austria-Hungary, residing at New York, in the county of New York and State of New York, have invented certain new and useful Improvements in Processes of Washing Yeast; and I do hereby declare the following to be a full, clear, and exact description of the invention, such as will enable others skilled in the art to which it appertains to make and use the same.

My invention relates to an improved method or process of washing yeast.

The object of the invention is to provide a method by which the thick liquid yeast may be washed and entirely cleansed of the small remnant of beer and other impurities which are usually retained therein before washing without wasting or lessening the strength of the yeast.

In washing yeast according to methods heretofore in use it has been the common practice to cause the thick liquid yeast after separation from the beer to run into a tank or receiver, and thereupon about four or five times as much water is added as there is yeast in the tank, and the whole is agitated so as to thoroughly mix the liquids and then allowed to stand for three or four hours for the purpose of permitting the yeast to settle. After settling the water is drawn off by means of a suitable valved pipe or faucet, so as to permit the yeast to be collected. This method is objectionable, however, for the reason that the large quantity of water used extracts valuable matter, which weakens the yeast and reduces its fermenting power, and great waste is also occasioned by the quantity of yeast which is carried off with the water, which never runs off perfectly clean. For the purpose of overcoming these objections I have invented and discovered a method by which the yeast may be washed and thoroughly cleansed in a short time and by the use of only a small quantity of water, thereby saving time and labor and at the same time avoiding all waste and retaining the full strength and purity of the yeast.

In the accompanying drawing I have illustrated a preferred form of apparatus for carrying my improved method into effect; but it will be understood, of course, that the construction and arrangement of the apparatus may be varied at pleasure and that the process may be carried into effect by the use of any apparatus adapted for such purpose.

The drawing represents a side elevation, partly in section, of an apparatus which may be used in practicing my invention.

A denotes a tank or receiver; B, a pump connected to said tank by means of an exit-pipe *a*.

C denotes a filter-press of ordinary construction having the usual filtering-cloths or other suitable filtering media and chambers therein to receive the liquid under pressure, and *b* denotes a suitable pipe, which connects the pump B with the filter-press, as shown.

With an apparatus of this character the thick liquid yeast which is run into the tank or receiver A after separation from the beer is forced by means of the pump B from said tank into the filter-press C. The yeast enters the filtering apparatus under pressure and distributes itself through the whole apparatus until the chambers formed by the dished faces of the frame are completely filled. Thereupon the desired quantity of water, which is determined by the quantity of yeast to be washed, is forced by means of the same pump, if desired, or by means of hydraulic or other suitable pressure, into the filter-press, so as to completely fill the same and permeate the mass of confined yeast, driving out and taking the place of the remaining beer and thoroughly washing the yeast, without, however, extracting therefrom valuable matter, which tends to destroy its strength. By this method it is possible to cleanse or wash the yeast with a very small quantity of water, usually about six (6) gallons of water to every one hundred (100) pounds of yeast, whereas with previous methods a large quantity of water is required, usually about two hundred and eighty (280) gallons of water to every one hundred (100) pounds of yeast, with the deleterious effects hereinbefore mentioned. The yeast, being thus cleansed, may be taken from the press without loss and without having had its strength materially diminished by the water.

The same result may be accomplished without using a pump by simply employing an elevated tank, from which the water for washing may be forced by hydraulic pressure into and through the filter-press and the yeast confined therein.

Having thus described my invention, what I claim as new, and desire to secure by Letters Patent, is—

1. The process, substantially as herein described, of cleansing or washing yeast, which consists, first, in running the thick liquid yeast into a suitable filtering apparatus, so as to confine the yeast therein in a compact mass, and then washing the yeast by forcing a small quantity of water into and through such apparatus and the mass of yeast confined therein, substantially as described.

2. The herein-described process of washing yeast, which consists, first, in forcing the thick liquid yeast into a suitable filtering apparatus, so as to confine the same therein under pressure in a compact mass, and, secondly, forcing a predetermined quantity of water into and through the filtering apparatus and the confined yeast, substantially as set forth.

In testimony whereof I affix my signature in presence of two witnesses.

ADOLPH KLIEMETSCHEK.

Witnesses:
HENRY J. KALTENBACH,
JACOB BENNINGER, Jr.